(12) United States Patent
Rabin et al.

(10) Patent No.: US 12,379,201 B2
(45) Date of Patent: *Aug. 5, 2025

(54) SYSTEMS AND METHODS FOR OPTICAL TRACKING OF HIGH PRECISION (71) Applicant: ELECTRONICS FOR IMAGING, INC., Londonderry, NH (US)

(72) Inventors: Noam Rabin, Fremont, CA (US); Hsinchia Chen, Saratoga, CA (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,441

(22) Filed: Jul. 1, 2024

(65) Prior Publication Data
US 2024/0353220 A1 Oct. 24, 2024

Related U.S. Application Data

(63) Continuation of application No. 17/501,691, filed on Oct. 14, 2021, now Pat. No. 12,055,377.

(51) Int. Cl.
| | |
|---|---|
| *G01B 11/04* | (2006.01) |
| *G01B 11/00* | (2006.01) |
| *G01C 15/00* | (2006.01) |
| *G01S 17/66* | (2006.01) |
| *G06V 10/75* | (2022.01) |

(52) U.S. Cl.
CPC ............ *G01B 11/04* (2013.01); *G01B 11/005* (2013.01); *G01C 15/002* (2013.01); *G01S 17/66* (2013.01); *G06V 10/758* (2022.01)

(58) Field of Classification Search
CPC .... G01B 11/04; G01B 11/005; G06V 10/758; G01C 15/002; G01S 17/66
See application file for complete search history.

(56) References Cited

U.S. PATENT DOCUMENTS

| | | | |
|---|---|---|---|
| 4,914,437 A | 4/1990 | Kibrick et al. | |
| 5,729,008 A | 3/1998 | Blalock et al. | |
| 2017/0098131 A1* | 4/2017 | Shashua | B60K 35/20 |
| 2019/0096069 A1 | 3/2019 | Qian et al. | |

OTHER PUBLICATIONS

PMJ9100S1: Media Tracking Chip Product Datasheet, version 1.20; PixArt Imaging Inc., Aug. 2018, pp. 1-15.

* cited by examiner

*Primary Examiner* — Jamil Ahmed
(74) *Attorney, Agent, or Firm* — Perkins Coie LLP (57) ABSTRACT

Introduced here is a system for optically tracking displacement with high precision across one or more axes. To track displacement of an object, images that are generated by a plurality of optical sensors can be compared against one another. For example, images that are generated by a first optical sensor can be compared against images that are generated by a second optical sensor. Because the first and second optical sensors are in a fixed spatial relationship with one another, displacement of the object can be established based on the degree to which a given image generated by the first optical sensor matches another image generated by the second optical sensor.

20 Claims, 8 Drawing Sheets

501 Initialize displacement tracking system that includes (i) a first optical sensor included in a first module and (ii) a second optical sensor included in a second module

502 First optical sensor generates an image of an object and then transmits the image to second module as a reference image

503 Second optical sensor generates an image of the object that serves as a current image

504 Second module compares the current image to the reference image

Does the current image match the reference image? — No → (return to 503)

Yes ↓

505 Generate an output that is representative of the total displacement

SYSTEMS AND METHODS FOR OPTICAL TRACKING OF HIGH PRECISION

CROSS-REFERENCE TO RELATED APPLICATIONS

This application is a continuation of U.S. application Ser. No. 17/501,691 filed Oct. 14, 2021, which is incorporated by reference herein in its entirety.

TECHNICAL FIELD

Various embodiments relate to systems for tracking optical displacement across one or more axes and associated methods.

BACKGROUND

Understanding the distance between a given object and another object—a concept referred to as "displacement tracking"—is important in various contexts. Consider, for example, a printer that is tasked with depositing ink on a substrate. In order to produce a product of high quality, the printer needs to deposit the ink onto the substrate with high precision. This requires that the printer fully understand the location of the substrate with respect to each nozzle through which ink is to be expelled.

Historically, displacement has been tracked, monitored, or otherwise determined through the use of optical displacement sensors (also referred to as "displacement sensors" or "optical sensors"). Normally, these optical sensors rely on noncontact sensing techniques to measure the distances between objects. These sensing techniques can generally be categorized as relating to either relative displacement tracking or absolute displacement tracking.

For relative displacement tracking, a conventional sensing technique may involve correlating digital images (or simply "images") that are generated by an optical sensor and captured at different times on a working surface. As an example, a handheld pointing device (also referred to as a "computer mouse") designed for control of computing devices may include an optical sensor that generates images of the underlying surface. Since the relative displacement of the computer mouse with respect to the underlying surface is usually associated with high correlation to the images, the accumulation of relative displacements of the computer mouse can be tracked through analysis of the images.

Another common application of relative displacement tracking involves coarse media in the context of printing. For coarse media tracking, a system on a chip (SoC) may be installed within the printer to replace more expensive encoders that have traditionally been responsible for determining when to make a cut of coarse media. In addition to the processor, memory, and other components, the SoC may include an optical sensor that is able to monitor coarse media on which the printer is to deposit ink. In contrast to computer mouse tracking, coarse media tracking tends to focus more on one axis of displacement than two axes of displacement. Therefore, more pixels may be placed along one axis of the optical sensor in comparison to the other axis to enable more accurate tracking without dramatically increasing the cost of the optical sensor.

For absolute displacement tracking, a conventional sensing technique may involve monitoring the absolute movement of an object of interest. As an example, optical encoder tracking-one type of absolute displacement tracking—may involve measuring rotational motion of an object by counting the number of codes from an encoded surface of the object. The number of observed codes may be used to estimate the rotational displacement. Alternatively, the codes may uniquely identify different locations along the encoded surface of the object, and the observed codes may be used to infer the rotational displacement. One simple approach to optical encoder tracking involves marking ones and zeros along the encoded surface of an object and then counting the number of ones to estimate displacement between the encoded surface and the optical sensor used for absolute displacement tracking.

Various features of the embodiments described herein will become more apparent to those skilled in the art from a study of the Detailed Description in conjunction with the drawings. Embodiments are illustrated by way of example and not limitation in the drawings. Accordingly, while the drawings depict various embodiments of the technology described herein, those skilled in the art will recognize that the technology is amenable to various modifications.

DETAILED DESCRIPTION

Displacement tracking is becoming increasingly important for various technologies. However, conventional approaches to displacement tracking suffer from several drawbacks.

For relative displacement tracking, a conventional sensing technique normally requires that images generated by an optical sensor at adjacent locations be compared. Usually, a first image (also referred to as a "reference image") is compared to a second image (also referred to as a "target image") that is acquired later in time to estimate the relative displacement of the optical sensor. However, a reference image can only be used with those nearby target images that overlap with the reference image. Simply put, the reference image must share an overlapping portion in common with the target image in order for a spatial relationship to be understood. When the overlapping portion decreases in size, the reference image needs to be updated.

This leads to a residue error from displacement estimation. When the length of displacement increases, more frequencies of reference images need to be updated to cause accumulated errors. The accumulated errors may be acceptable for some applications, like determining movement of a computer mouse, since the errors can be reset by moving the optical sensor (e.g., by lifting the computer mouse off the underlying surface). However, the accumulated errors may be unacceptable for other applications. For example, when measuring the displacement of a substrate in a printer system (or simply "printer")—for example, in preparation of cutting the substrate or depositing ink onto the substrate—the accumulated errors could easily cause significant problems. The substrate could be cut in the wrong location, or the ink could be deposited in the wrong location.

Conversely, codes or marks are generally needed along the surface of an object whose displacement is to be tracked for most applications of absolute displacement tracking. Although deciphering the codes and/or counting the marks may be done to achieve high precision for estimating displacement (e.g., of media in a printer), it is not always practical to track the object in this manner. As an example, it may be impractical or undesirable to add codes or marks to a substrate whose displacement is to be tracked as the substrate in a printer. For instance, these codes or marks may not only add to the expense of printing, but may also lead to waste after the substrate has been printed on and then cut. It may be impractical to place an encoder on the substrate.

Accordingly, an improved approach to displacement tracking is needed, especially one that is practical for printing applications.

Introduced here, therefore, is a system for optical tracking of high precision across one or more axes. Some embodiments of the system are suitable for single-axis tracking, while other embodiments of the system are suitable for multi-axis tracking. Applications of single-axis tracking include (i) estimating the displacement of substrates (also referred to as "media") in printers and (ii) estimating the rotational displacement of mechanical elements such as digital crowns that are often located along the side of computing devices such as watches and fitness trackers. One example of an application of multi-axis tracking is the autonomous movement of an object (e.g., a robotic vacuum cleaner) through a physical environment.

For the purpose of illustration, the system may be described in the context of tracking displacement of a substrate in a printer (e.g., an inkjet printer or laser printer). However, those skilled in the art will recognize that the system could be readily adopted for other applications. For accurate tracking of displacement of substrates, a plurality of optical sensors that are in a fixed spatial relationship can be introduced into a printer. These optical sensors may not only have a fixed spatial relationship with reference to one another, but also to other components of the printer (e.g., the bay in which substrates are positioned during printing, the belt along which substrates are conveyed during printing). Such an approach allows displacement of substrates to be accurately tracked with high precision, thereby allowing inks to be precisely dropped onto the substrates and the substrates to be precisely cut.

Terminology

Brief definitions of terms used throughout the present disclosure are provided below.

References to "an embodiment," "one embodiment," or "some embodiments" mean that the feature being described is included in at least one embodiment of the technology described herein. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Accordingly, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, objects may be electrically or communicatively coupled to one another despite not sharing a physical connection.

When used in reference to a list of multiple items, the term "or" is intended to cover all of the following interpretations: any of the items in the list, all of the items in the list, and any combination of items in the list.

Overview of Displacement Tracking System

To avoid printing codes or marks on an object (e.g., a substrate that is to travel through a printer) to be tracked, at least two optical sensors—each contained in a corresponding module—can be installed within a structure (e.g., the printer) so as to establish a fixed distance therebetween. Said another way, a first optical sensor contained in a first module (also referred to as the "first structural unit") can be installed so as to maintain a known distance with respect to a second optical sensor contained in a second module (also referred to as the "second structural unit"). The first optical sensor in the first module can capture an image that serves as a reference image. This reference image can be transmitted to the second module for comparison purposes. More specifically, this reference image can be transmitted to the second module, so that the second module can compare the reference image to images that are generated by the second optical sensor. As further discussed below, this reference image could be transmitted from the first module to the second module via a wired communication channel, or this reference image could be transmitted from the first module to the second module via a wireless communication channel.

When the reference image is determined to substantially match to a given image generated by the second optical sensor in the second module, the total displacement of the substrate can be inferred based on the fixed distance between the first and second modules. Assume, for example, that the first and second modules are installed in the printer so as to be 25 centimeters (cm) away from one another. When the reference image generated by the first optical sensor substantially matches an image generated by the second optical sensor, then the system can infer that the substrate has been displaced by 25 cm.

Figure 1:
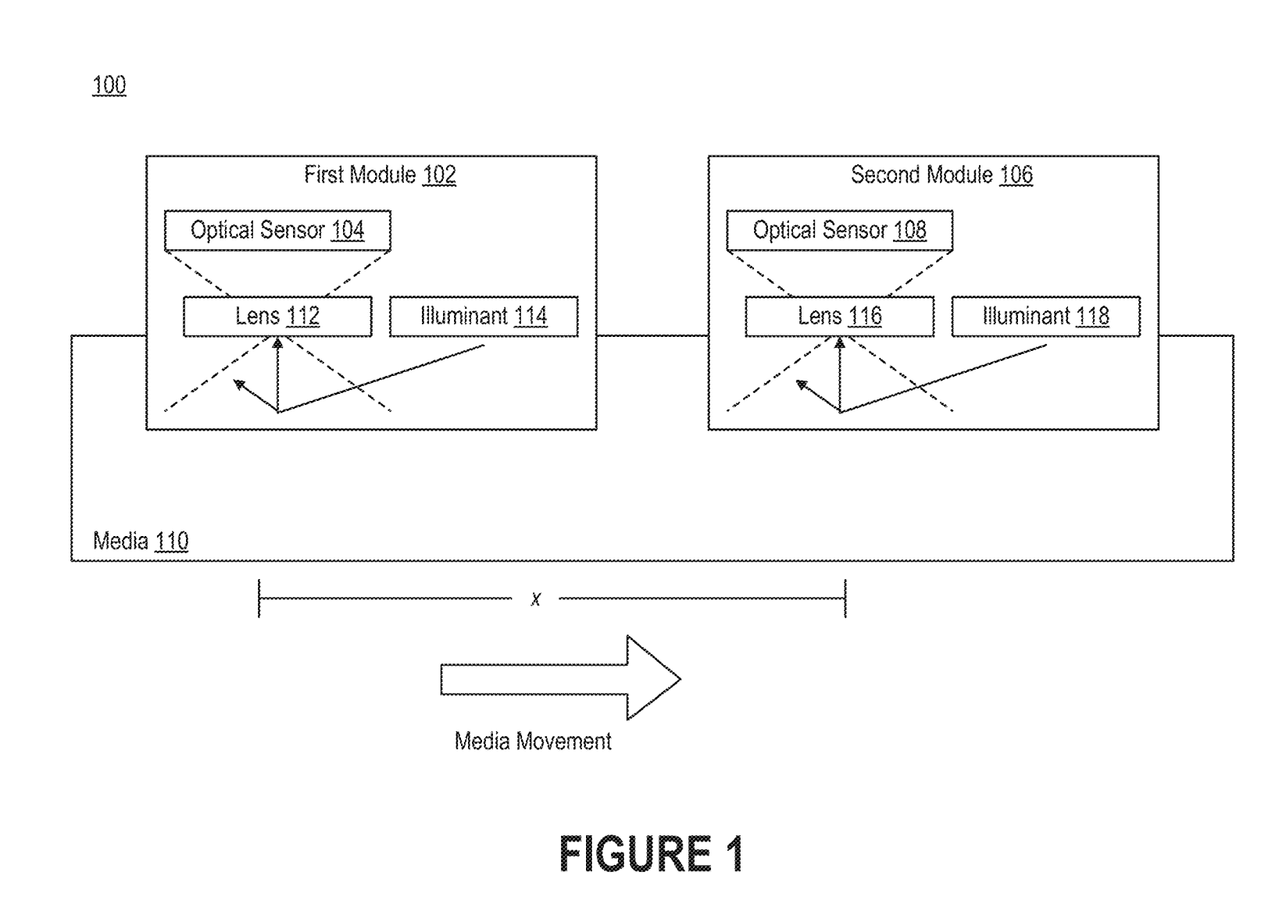
FIG. 1 includes a high-level illustration of a displacement tracking system that includes a pair of optical sensors that are contained in respective modules.

FIG. 1 includes a high-level illustration of a displacement tracking system 100 (or simply "system") that includes a pair of optical sensors 104, 108 that are contained in respective modules 102, 106. The system 100 is configured to optically track displacement of media 110 as it travels in a given direction (indicated by arrow 112) through a printer. Generally, this direction is referred to as the "media movement direction" or "media feed direction."

As shown in FIG. 1, the distance x between the pair of optical sensors 104, 108 can be fixed at a predetermined amount. As an example, the distance x between the pair of optical sensors 104, 108 may be fixed at 25 cm. In other embodiments, the distance x could be more or less than 25 cm. The distance x may be based on the field of view of the optical sensors 104, 108, as well as the vertical positioning of the optical sensors 104, 108 with respect to the surface of the media 110 to be tracked. Additionally or alternatively, the distance x may be based on the amount of displacement that is expected of the media 110. For example, if the media 110 is situated on a belt that is meant to transfer the media 110 through the printer, then the distance x may be based on the rate at which the belt transfers the media 110.

At a high level, the general concept is to compare images that are acquired by different optical sensors situated in different locations, so as to determine how much the media 110 has been displaced. For example, the first module 102 may be connected to a first structural feature of the printer, while the second module 106 may be connected to a second structural feature of the printer. When a first image generated by a first optical sensor 104 is determined to match a second image generated by a second optical sensor 108, then the system 100 can infer that the media 110 has been displaced by the distance x. The system 100 can establish the degree of similarity between the first and second images in several different ways. For example, the second module 106 may employ an image comparison algorithm (or simply "comparison algorithm") that programmatically compares pixel data of the first image to pixel data of the second image to produce an output that is representative of the degree of similarity. This comparison algorithm could perform a strict comparison, fuzzy pixel comparison, histogram comparison, or correlation comparison of the first and second images. Additionally or alternatively, this comparison algorithm could define and then employ image masks (or simply "masks") to verify whether the first image matches the second image. As an example, assume that the second module 106 is tasked with comparing images generated by the pair of optical sensors 104, 108 in a pairwise manner. Thus, the second module 106 may repeatedly compare pairs of images, namely, one image generated by optical sensor 104 and another image generated by optical sensor 108. For each image included in a pair of images, the intensity values in a two-dimensional (2D) array may preferably be processed to generate a 2D feature image. Rather than compare the pair of images, the second module 106 may compare the corresponding pair of 2D feature images in order to generate an output (e.g., a 2D array) that represents the degree of similarity between the pair of images with different relative offsets. Thus, the output may be used to determine whether the pair of images are matching or not.

Regardless of its approach, the comparison algorithm can produce an output that is representative of the degree of similarity as mentioned above. If this output exceeds a predetermined threshold, then the second module 106 may determine that the second image matches the first image. However, if this output falls below the predetermined threshold, then the second module 106 may determine that the second image does not match the first image.

Note that the first optical sensor 104 of the first module 102 may continue to generate images without waiting for results of the comparison performed by the second module 106. Thus, the first optical sensor 104 may generate images at a predetermined frequency (e.g., 4, 8, 30, or 60 images per second) so as to generate a first stream of images. As further discussed below, the first stream of images can be transmitted to the second module 106 in near real time (e.g., as those images are generated). In such a scenario, the duration of time between transmissions is based on the rate at which images are generated by the first optical sensor 104. Alternatively, the first stream of images can be transmitted to the second module 106 in "batches." Each "batch" may include those images that were generated within a preceding interval of time (e.g., 1, 2, or 5 seconds). A "batch" approach to transmitting the images may be desirable in scenarios where communication resources are limited, though the "batch" approach will delay the comparison performed by the second module 106 and so may only be suitable where the media 110 is unlikely to experience much displacement over short intervals of time.

Similarly, the second optical sensor 108 of the second module 106 can generate images independent of the first optical sensor 104 of the first module 102. Thus, the second optical sensor 108 may also generate images at a predetermined frequency (e.g., 4, 8, 30, or 60 images per second) so as to generate a second stream of images. Generally, the second optical sensor 108 generates images at the same frequency as the first optical sensor 104, so that each image in the second stream of images can be matched with a corresponding image in the first stream of images. However, the second optical sensor 108 does not necessarily have to generate images at the same frequency as the first optical sensor 104. Assume, for example, that the system 100 is designed such that images generated by the first optical sensor 104 are transmitted to the second module 106 for comparison to images generated by the second optical sensor 108. This may be done if the media 110 is known to move so as to be situated beneath the second optical sensor 108 after being situated beneath the first optical sensor 104. In this situation, the second optical sensor 108 may have a higher frequency to ensure that comparisons are accurate. If the second optical sensor 108 had a lower frequency than the first optical sensor 104, an image generated by the first optical sensor 104 might not match any images generated by the second optical sensor 108.

Accordingly, the second module 106 may compare each image generated by the second optical sensor 108 to one or more images generated by the first optical sensor 104. This comparison operation may be performed in near real time (e.g., every 0.0625, 0.125, or 0.25 seconds if the second optical sensor 108 generates images at 16, 8, or 4 images per second).

Besides the comparison of images from the pair of optical sensors 104, 108, the system 100 may also be able to compare images to prior images generated by the same sensor to track displacement. Assume, for example, that the first optical sensor 104 in the first module 102 generates a first stream of images as discussed above. In such a scenario, the first module 102 may compare a first image in the first stream of images to a second image in the first stream of images. This second image may be, for example, the image that follows the first image in the first stream of images. This comparison operation may be performed by the first module 102 to obtain relative displacement results of fine resolution. However, good precision of relative displacement generally depends on the images being sufficiently high quality (e.g., at least 1,200, 2,400, or 3,600 counts per inch). The second module 106 could also compare images generated by the second optical sensor 108 in a comparable manner. Accordingly, the system 100 may be able to obtain relative displacement results from the first module 102 or second module 106 in addition to, or instead of, absolute displacement results from the second module 106.

Figure 2:
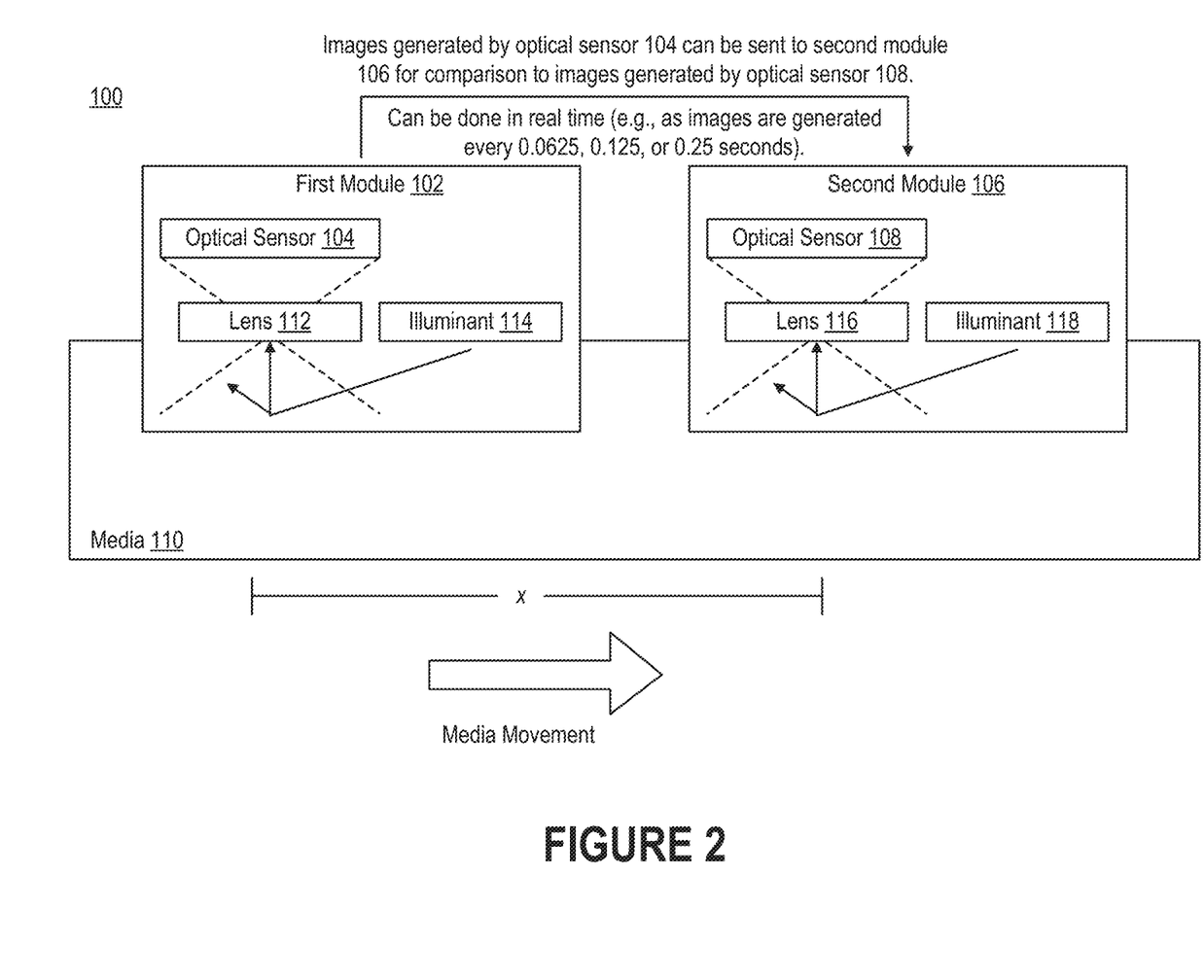
FIG. 2 includes a high-level illustration of communication flow between the first and second modules of FIG. 1.

FIG. 2 includes a high-level illustration of communication flow between the first and second modules 102, 106 of FIG. 1.

To generate a first image of the media 110, an illuminant 114 in the first module 102 can emit light towards the surface of the media 110. The illuminant 114 could be, for example, a light-emitting diode (LED), laser, incandescent bulb, or the like. Light reflected by the surface of the media 110 can be guided through a lens 112 toward the first optical sensor 104, which can then convert the reflected light into the first image. Said another way, the first optical sensor 104 can generate the first image so as to be representative of the reflected light. Note that the lens 112 may not be necessary if the illuminant 114 is a laser or another source of coherent light since speckle images could be used instead of reflectance images for tracking purposes.

To generate a second image of the media 110, an illuminant 118 in the second module 106 can emit light towards the surface of the media 110. Again, the illuminant 118 could be an LED, laser, incandescent bulb, or the like. Light reflected by the surface of the media can be guided through a lens 116 toward the second optical sensor 108, and the second optical sensor 108 can generate the second image so as to be representative of the reflected light.

As mentioned above, a core aspect of the system 100 is its ability to compare images generated by the first optical sensor 104 to images generated by the second optical sensor 108. As such, the images generated by the first and second optical sensors 104, 108 may need to be collocated at some point in time. Generally, this is achieved by transmitting images generated by the first optical sensor 104 from the first module 102 to the second module 106. However, this could also be achieved by (i) transmitting images generated by the first optical sensor 104 from the first module 102 to a given destination and (ii) transmitting images generated by the second optical sensor 108 from the second module 106 to the given destination. The given destination could be, for example, a processor that is part of the system 100 or the printer in which the system 100 is implemented.

In order for images generated by the first and second optical sensors 104, 108 to be properly correlated with one another, the first and second optical sensors 104, 108 may be synchronized with one another. At a high level, synchronization involves matching the operations of the first and second optical sensors to have more precise calculation, especially using absolute comparison results and relative comparison results at the same time. For example, the first and second optical sensors 104, 108 may be synchronized by the same clock signal. This clock signal may be generated by a clock module that is contained in the first module 102 or second module 106. Assume, for example, that the clock module is contained in the first module 102. In such a scenario, the clock signal may accompany some or all of the images transmitted from the first module 102 to the second module 106. If the clock module is instead contained in the second module 106, then the clock signal may be provided to the first module 102 in the form of an acknowledgement upon receiving an image from the first module 102. Regardless of the source of the clock signal, synchronization may help ensure that the timestamps appended to images by the first optical sensor 104 are based on the same clock signal as the timestamps appended to images by the second optical sensor 108.

As images are received by the second module 106 from the first module 102, these images may be temporarily stored in a "ping-pong" buffer mechanism as further discussed below with reference to FIG. 3. The ping-pong buffer mechanism may allow for a seamless transition in updating the reference image that is presently of interest for comparison purposes.

For the purpose of illustration, an exemplary use case is described below. The values have been provided for illustration only, and therefore are not intended to limit the embodiments described above. Generally, the goal is to have relatively fast movement of media through a printer. For instance, the maximum movement speed of the media may exceed 90 meters per minute (m/min). If the distance x between the first and second optical sensors 104, 108 is 25 cm, then the first module 102 may transmit images to the second module 106 at a rate of one image every 0.0625 seconds, so as to permit a maximum movement speed of 240 m/min as follows:

$$0.25 \text{ meters} \times (1/0.0625 \text{ seconds}) = 4 \text{ m/sec} = 240 \text{ m/min}.$$

Meanwhile, the absolute count from the first module 102 to the second module 106 may be 5,000 counts (250,000/50) with a sensor pixel pitch of 50 micrometers. In this example, the calculation treats a pixel as a unit. In some situations, however, it may be valuable or necessary to perform sub-pixel calculations. Usually, sub-pixel calculations require that interpolation be used, for example, to have multiple integral or fractional times of the counts.

Figure 3:
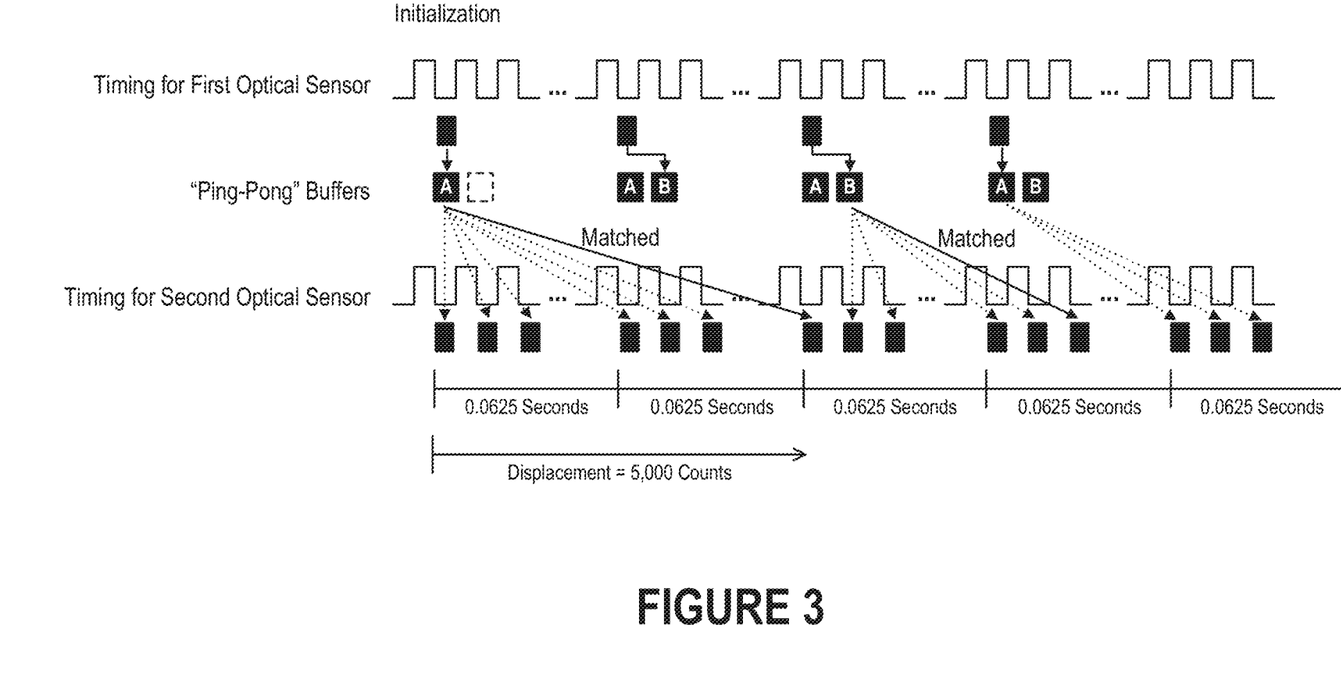
FIG. 3 includes an illustration of a timing sequence diagram for comparing images acquired from different optical sensors.

FIG. 3 includes an illustration of a timing sequence diagram for comparing images acquired from different optical sensors. More specifically, FIG. 3 shows how a ping-pong buffer mechanism can be used to facilitate the continuous and seamless tracking of displacement. For initialization, one image is generated by the first optical sensor (e.g., first optical sensor 104 of FIGS. 1-2) and then stored in Buffer A as a first reference image and transmitted to the second module (e.g., second module 106 of FIGS. 1-2) for comparison purposes. In the meantime, images can continue to be generated by the first optical sensor and used to continuously update Buffer B. Thus, the image that is stored in Buffer B may be continually replaced as new images are generated by the first optical sensor so long as the second module is still performing the comparison operation.

When a matching image has been found for the reference image stored in Buffer A, the image that is stored in Buffer B can be transmitted to the second module as a second reference image for comparison purposes. The second module can then perform another comparison operation in which it attempts to find a matching image for this second reference image that is stored in Buffer B. As the second module performs the comparison operation, images that are generated by the first optical sensor can be used to continuously update Buffer A. Accordingly, images generated by the first optical sensor can be continuously loaded in either Buffer A or Buffer B based on which of those buffers is currently storing the reference image that is being used by the second module 106 for comparison.

As shown in FIG. 3, the system can alternatively load images generated by the first optical sensor into two buffers, namely, Buffer A and Buffer B. In operation, these images will be loaded in an alternating pattern (i.e., Buffer A, Buffer B, Buffer A, Buffer B, etc.). However, circular usage of more than two buffers is also possible. For example, if images generated by the first optical sensor can be loaded into the three buffers (i.e., Buffer A, Buffer B, and Buffer C), then the images can be loaded in a circular pattern (e.g., Buffer A, Buffer B, Buffer C, Buffer A, Buffer B, Buffer C, etc.).

Figure 4:
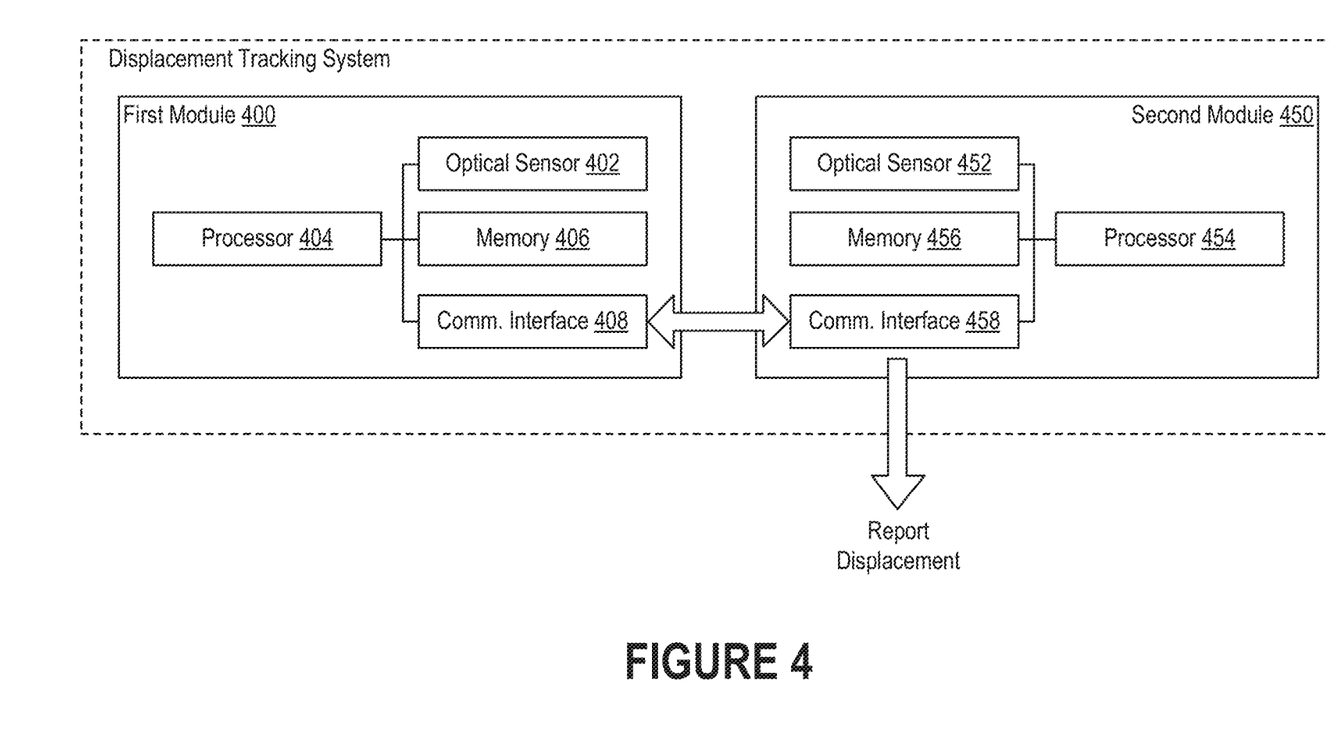
FIG. 4 includes a block diagram of a system for optically tracking displacement of an object of interest.

FIG. 4 includes a block diagram of a system for optically tracking displacement of an object of interest. In FIG. 4, there are two separate modules, namely, a first module 400 and second module 450.

As shown in FIG. 4, the first module 400 can include an optical sensor 402, processor 404, memory 406, and communication interface 408. Similarly, the second module 450 can include an optical sensor 452, processor 454, memory 456, and communication interface 458. Each of these components is discussed in greater detail below.

The optical sensors 402, 452 may be any electronic sensor that is able to detect and convey information in order to generate image data that is suitable for comparison. Examples of optical sensors include charge-coupled device (CCD) sensors and complementary metal-oxide semiconductor (CMOS) sensors. In some embodiments, each optical sensor is implemented in a camera module (or simply "camera") that is installed in the respective module.

The processors 404, 454 can have generic characteristics similar to general-purpose processors, or the processors 404, 454 can be application-specific integrated circuits (ASICs) that provide control functions to the respective modules 400, 450. As shown in FIG. 4, each processor can be coupled to all components of its respective module, either directly or indirectly, for communication purposes.

The memories 406, 456 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processors 404, 454, the memories 406, 456 can also store data generated by the processors 404, 454 and/or images generated by the optical sensors 402, 452. Note that the memories 406, 456 are merely abstract representations of storage environments. The memories 406, 456 could be comprised of actual integrated circuits (also referred to as "chips").

The communication interfaces 408, 458 (also referred to as "data interfaces") may be part of respective communication modules that are responsible for managing communications external to the corresponding modules 400, 450. Said another way, the communication interface 408 of the first module 400 may be responsible for managing communications with other computing devices-such as the second module 450—that are external to the first module 400. Similarly, the communication interface 450 of the second module 450 may be responsible for managing communications with other computing devices-such as the first module 400—that are external to the second module 450. The communication interfaces 408, 458 may be part of, or supported by, wireless communication circuitry that is designed to establish wireless communication channels. Examples of wireless communication circuitry include integrated circuits configured for Bluetooth, Wi-Fi, Near Field Communication (NFC), and the like. Accordingly, images generated by the optical sensor 402 could be wirelessly transmitted by the first module from its communications interface 408 to the communications interface 458 of the second module 450.

Note that in embodiments where the communication interfaces 408, 458 enable wireless communication, the communication interfaces 408, 458 do not necessarily have to be identical to one another. Generally, the communication interfaces 408, 458 are representative of transceivers that are operable to both transmit and receive data using an antenna. However, in embodiments where the first module 400 does not need to receive data from the second module 450, the communication interface 408 of the first module 400 may be representative of a transmitter. Additionally or alternatively, in embodiments where the second module 450 does not need to transmit data outside the system, the communication interface 458 of the second module 450 may be a receiver.

Alternatively, the communication interfaces 408, 458 may be representative of physical interfaces to which opposing ends of a cable suitable for communication can be connected. In such embodiments, the communication interfaces 408, 458 may be referred to as "cable connectors" or "cable interfaces." Each cable connector may include electrical connections that allow it to properly interface with one end of the cable, so as to allow data to be transmitted either unidirectionally (e.g., from the first module 400 to the second module 450) or bidirectionally (e.g., from the first module 400 to the second module 450, and vice versa).

One main function of the first module 400 is to generate images that can serve as the reference images for comparison of images generated by the second module 450. Accordingly, the second module 450 may be responsible for estimating absolute displacement through a comparison of images generated by the optical sensor 402 of the first module 400 to images generated by the optical sensor 452 of the second module 450. As discussed above, the second module 450 may also be able to compare images generated by the optical sensor 452 to one another to track displacement in a relative sense. For example, the second module 450 may compare a first image generated by the optical sensor 452 at a first point in time to a second image generated by the optical sensor 452 at a second point in time to obtain an output that is representative of relative displacement. The second image may be generated by the optical sensor 452 immediately following the first image, or the first and second images may be temporally or positionally separated by a predetermined amount (e.g., with 4 other images therebetween).

Accordingly, the second module 450 may be able to report relative displacement in addition to, or instead of, absolute displacement as determined through comparison of its images to those generated by the first module 400. The first module 400 could also generate an output that is representative of relative displacement as discussed above. This output could be reported out separately by the first module 400, or this output could be transmitted to the second module 450 for reporting with its own outputs.

As shown in FIG. 4, the outputs (e.g., absolute displacement determined by second module 450, relative displacement determined by second module 450, or relative displacement determined by first module 400) can be reported by the displacement tracking system. The nature of this reporting may depend on the application of the displacement tracking system. As an example, if the displacement tracking system is implemented in a printer, then displacement of the media contained therein may be reported by the displacement tracking system to the printer so that the printer can alter its actions (e.g., adjust the speed with which the media is conveyed, adjust the position of the nozzles through which ink is expelled onto the media, adjust the position of a cutting implement that is responsible for cutting the media).

Figure 5:
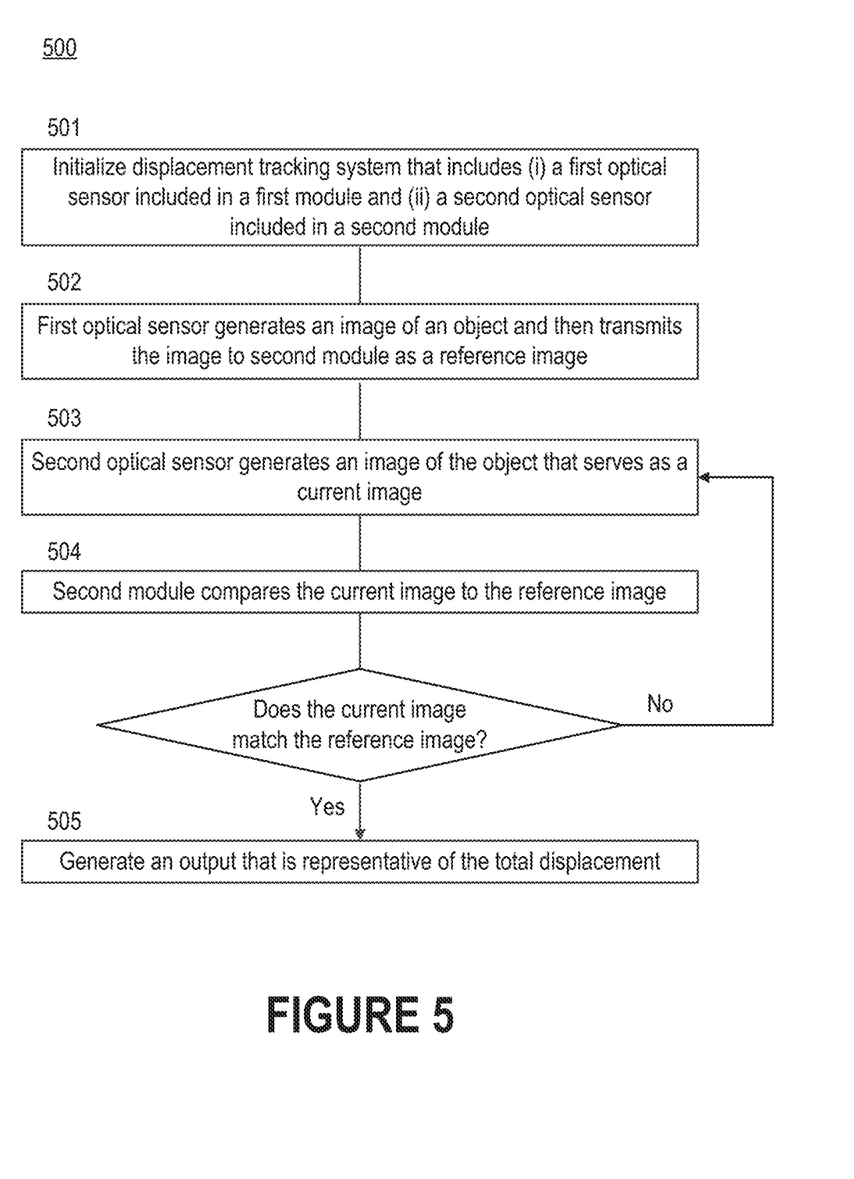
FIG. 5 includes a flow diagram of a process for optically tracking displacement of an object of interest using a displacement tracking system (that comprises a pair of optical sensors.

FIG. 5 includes a flow diagram of a process 500 for optically tracking displacement of an object of interest using a displacement tracking system (or simply "system") that comprises a pair of optical sensors. Initially, the system can be initialized by an operator (also referred to as a "user") (step 501). As part of the initialization procedure, a first optical sensor included in a first module can be synchronized with a second optical sensor included in a second module.

For example, a clock signal that is generated by a clock module implemented in the first module may be provided to the second module for synchronization purposes, or a clock signal that is generated by a clock module implemented in the second module may be provided to the first module for synchronization purposes. Only having a single clock module that is implemented in either the first module or second module may be valuable as it limits cost and simplifies synchronization since only one clock signal serves as the reference. However, clock modules could be implemented in the first and second modules. In such a scenario, the incoming clock signal could be used by the first module or second module to "set" its native clock signal.

After the initialization procedure is complete, the first optical sensor of the first module can generate an image and then transmit the image to the second module as a reference image (step 502). Moreover, the second optical sensor of the second module can generate an image that serves as the "current image" or "target image" (step 503).

The second module can then compare the current image generated by the second optical sensor to the reference image generated by the first optical sensor (step 504). For example, the second module may compare the current image to the reference image in order to estimate a motion vector that indicates the general direction and magnitude of motion of the object. The motion vector can be created based on the 2D output generated through comparison of the current image and reference image with different offsets in the x-axis and y-axis. For instance, (1, −2) is one example of a motion vector that specifies the relative shift in terms of magnitude and direction along the x-axis and y-axis, respectively. Also, the unit of the motion vector may depend on the type of calculation being performed (e.g., pixel level or sub-pixel level). If no sub-pixel calculations are performed, the unit of the motion vector may be pixels. However, if sub-pixel calculations are performed than the unit of the motion vector may be fractional pixels (e.g., 1/16 pixel or 1/32 pixel).

If the current image matches the reference image, then the second module can generate an output that is representative of the total displacement (step 505). As discussed above, the total displacement can be inferred, computer, or otherwise determined based on the known spatial relationship between the first and second optical sensors, as well as other features of the object of interest, the device in which the system is implemented, etc. However, if the current image does not match the reference image, then the second module can compare another image that is generated by the second optical sensor to the reference image generated by the first optical sensor. Thus, the second module can continually compare images generated by the second optical sensor to the reference image generated by the first optical sensor until a match is found (and thus, the displacement can be established). There may also be situations where the second module determines the rate of displacement in addition to, or instead of, the total displacement. For example, if the system is implemented on a robotic vacuum cleaner, the displacement rate could be used to manage actions of the robotic vacuum cleaner. Different strengths of vacuuming could be deployed with different rates of displacement, for example. More generally, the rate of displacement may provide helpful context for how an object to which the system is connected traverses a physical environment.

There are various approaches to determining if a pair of images (e.g., the reference and current images) are a match. For example, a constant threshold value may be adopted for thresholding an estimated correlation coefficient that is produced by the second module upon applying an algorithm to the reference and current images. As another example, the second module may attempt to determine whether the difference between the reference and current images (e.g., in terms of correlation, color content, color gamut, etc.) is relatively lower than for unmatched images.

Comparing images generated by a single sensor can also serve as a means of estimating the relative displacement in a manner similar to a computer mouse. This can be done for images generated by the first optical sensor and/or images generated by the second optical sensor. Such an approach to estimating the relative displacement may be sufficient to provide an estimation with 1,200 or 3,600 CPI. The combination of absolute displacement as estimated based on a comparison of images generated by multiple optical sensors and relative displacement as estimated based on a comparison of images generated by a single optical sensor may provide estimated displacement of fine resolution but with high precision.

Figure 6:
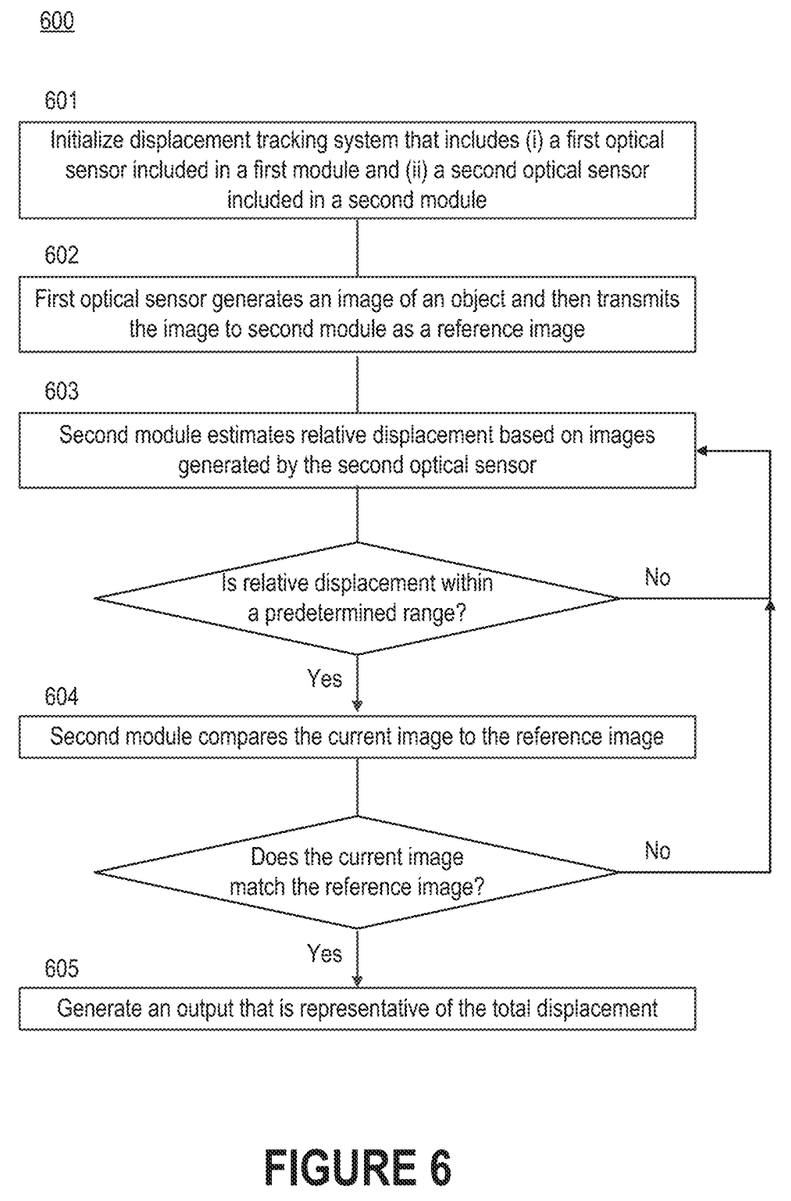
FIG. 6 includes a flow diagram of a process for selectively comparing images generated by a first optical sensor and second optical sensor based on whether the accumulated displacement is determined to be within a predetermined range.

FIG. 6 includes a flow diagram of a process 600 for selectively comparing images generated by a first optical sensor and second optical sensor based on whether the accumulated displacement is determined to be within a predetermined range. Initially, the displacement tracking system of which the first and second optical sensors are a part can be initialized by an operator (step 601). After the initialization procedure is complete, the first optical sensor can generate an image of an object of interest and then transmit the image to a second module that includes the second optical sensor as a reference image (step 602). Steps 601-602 of FIG. 6 may be substantially similar to steps 501-502 of FIG. 5.

As mentioned above, the second optical sensor included in the second module may be configured to generate images at a predetermined frequency, so as to create a series of images over time. For each image that is generated by the second optical sensor, the second module may estimate relative displacement of the object based on a comparison to at least one prior image generated by the second optical sensor (step 603). For example, the second module may compare temporally adjacent pairs of images to estimate the relative displacement of the object. If the second module determines that the relative displacement is within a predetermined range, then the second module can continue with the comparison operation. As an example, consider the example mentioned above in which there are 5,000 counts between the first and second optical sensors. In this example, the bounds of the predetermined range may be set to 4,500 and 5,500 to ensure precise matching even if the relative displacement has a small error (e.g., up to 10 percent) in counts. The bounds of the predetermined range may be tailored based on (i) the number of counts between the first and second optical sensors and (ii) the desired precision of matching.

Thus, the second module can compare the most recent image (also referred to as the "current image") generated by the second optical sensor to the reference image (step 604). Step 604 of FIG. 6 may be substantially similar to step 504 of FIG. 5. However, if the second module determines that the relative displacement is not within the predetermined range, then the second module may estimate displacement again with a different image serving as the current image. Such an approach ensures that the comparison operation is only fully completed in response to the second module determining that the object has moved at least a predetermined amount. As shown in FIG. 5, in the event that the second module determines that the current image does not match the reference image, the process 600 can also revert to step 603.

If the second module determines, through the comparison operation, that the current image matches the reference image, then the second module can generate an output that is representative of the total displacement (step 605). Step 605 of FIG. 6 may be substantially similar to step 505 of FIG. 5.

Note that while the sequences of the steps performed in the processes described above are exemplary, the steps can be performed in various sequences and combinations. For example, could be added to, or removed from, these processes. Similarly, steps could be replaced or reordered. Thus, the descriptions of these processes are intended to be open ended.

Additional steps may also be included in some embodiments. For example, the second module may generate an output that is representative of the total displacement as discussed above with reference to steps 505 and 605 of FIGS. 5 and 6. This output could be processed, formatted, or otherwise handled based on its intended use or destination. For example, if the displacement tracking system is implemented in a printer through which media travels, the output may be representative of, or used to generate, an instruction to alter the operation of the printer, so as to accommodate displacement of the media.

Figure 7A:
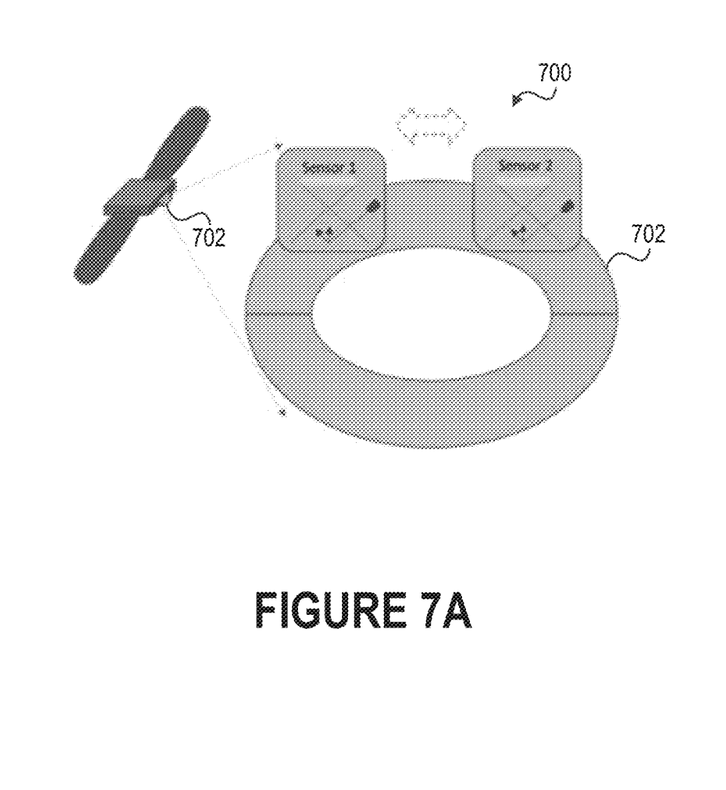
FIG. 7A illustrates how a displacement tracking system could be used to track rotational displacement of a mechanical element.
Figure 7B:
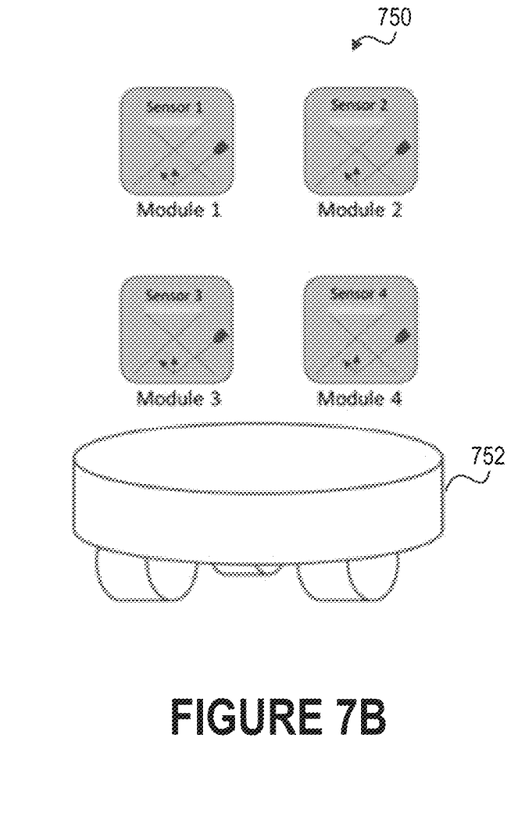
FIG. 7B illustrates how a displacement tracking system could be used to track displacement of an object along multiple axes.

FIGS. 7A-B shows two additional applications of a displacement tracking system, besides single-axis tracking of media through a printer as discussed above.

FIG. 7A illustrates how a displacement tracking system 700 could be used to track rotational displacement of a mechanical element 702. Mechanical elements are commonly used to control computing devices. One example of a mechanical element that acts as a control mechanism through rotational movement is a digital crown. Digital crowns are often located along the side of computing devices such as watches and fitness trackers. In the embodiment shown in FIG. 7A, the optical sensors of the system 700 may be configured to generate images of the mechanical element 702.

FIG. 7B illustrates how a displacement tracking system 750 could be used to track displacement of an object along multiple axes. Here, for example, the object is a robotic vacuum cleaner 752 that is operable to autonomously traverse a physical environment based on signals output by the displacement tracking system. However, the optical sensors of the system 750 may be configured to generate images of the surface underlying the robotic vacuum cleaner 752 rather than a component of the robotic vacuum cleaner 752. One notable advantage of using the displacement tracking system 750 to track displacement is its precision. Currently, the demand for precision in 2D navigation is high (and continually getting higher). More information regarding movement along multiple axes can be generated with more than one optical sensor. For example, axial displacement could be monitored using a pair of optical sensors as discussed above. Additionally or alternatively, rotation could be monitored using another pair of optical sensors.

As can be seen in FIGS. 7A-B, the system could include two or more modules, each with its own optical sensor. Generally, the number of modules is based on the number of axes along which displacement is to be tracked. For example, the system may only include two modules if displacement is to be tracked along a single axis. However, the system may include at least three modules if displacement is to be tracked along multiple axes. A larger number of modules generally corresponds to higher precision in estimating displacement since there are more known dimensions (e.g., between different pairs of optical sensors) that can serve as reference measurements. However, larger numbers of modules may also require more computational resources as more images must be compared in near real time.

Processing System

Figure 8:
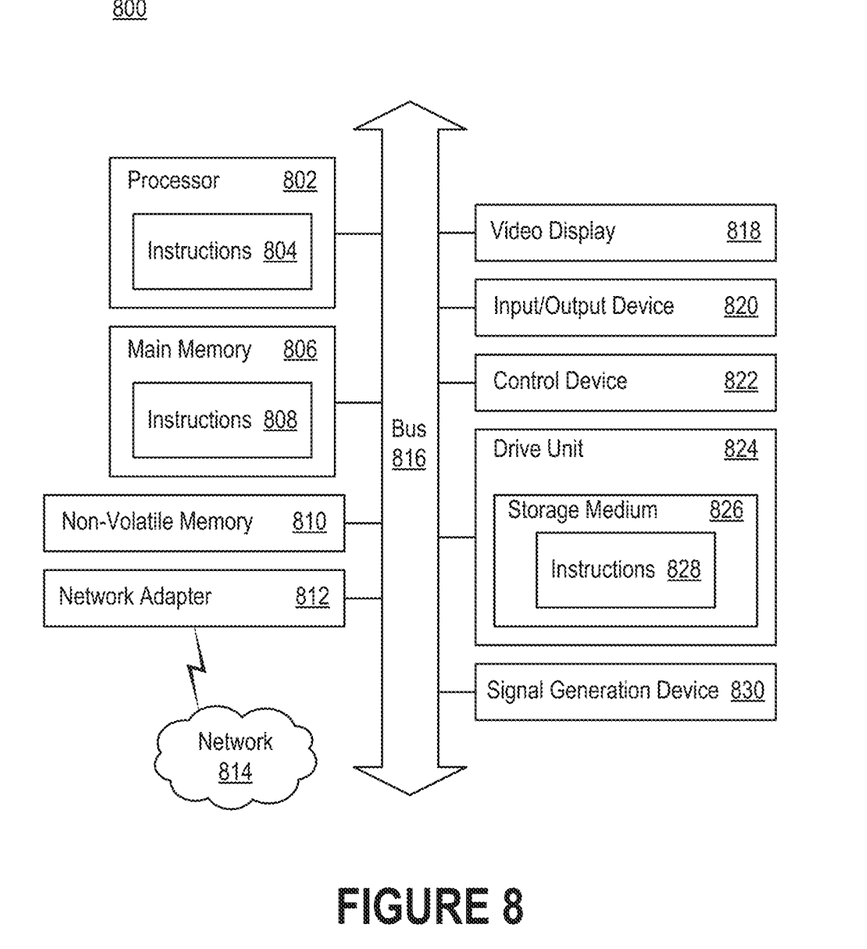
FIG. 8 is a block diagram illustrating an example of a processing system in which at least some of the operations described herein can be implemented.

FIG. 8 is a block diagram illustrating an example of a processing system 800 in which at least some of the operations described herein can be implemented. For instance, components of the processing system 800 may be hosted on a computing device in which a displacement tracking system (e.g., displacement tracking system 100 of FIG. 1) is implemented. As an example, components the processing system 800 could be hosted on a printer in which the displacement tracking system is implemented to monitor displacement of media traveling therethrough.

The processing system 800 may include a processor 802, main memory 806, non-volatile memory 810, network adapter 812, video display 818, input/output device 820, control device 822 (e.g., a keyboard or pointing device, such as a computer mouse), drive unit 824 that includes a storage medium 826, or signal generation device 830 that are communicatively connected to a bus 816. The bus 816 is illustrated as an abstraction that represents one or more physical buses or point-to-point connections that are connected by appropriate bridges, adapters, or controllers. The bus 816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), an inter-integrated circuit (I2C) bus, or an Institute of Electrical and Electronics Engineers (IEEE) standard 1394 bus (also referred to as "Firewire").

While the main memory 806, non-volatile memory 810, and storage medium 826 are shown to be a single medium, the terms "machine-readable medium" and "storage medium" should be taken to include a single medium or multiple media (e.g., a centralized or distributed database and/or associated caches and servers) that store one or more sets of instructions 828. The terms "machine-readable medium" and "storage medium" shall also be taken to include any medium that is capable of storing, encoding, or carrying a set of instructions for execution by the processing system 800.

In general, the routines executed to implement the embodiments of the present disclosure may be implemented as part of an operating system or a specific computer program. A computer program typically comprises one or more instructions (e.g., instructions 804, 808, 828) that are set at various times in various memory and storage devices in a computing device. When read and executed by the processor 802, the instruction(s) cause the processing system 800 to perform operations to execute elements involving the various aspects of the present disclosure.

Further examples of machine- and computer-readable media include recordable-type media, such as volatile and non-volatile memory devices, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 812 enables the processing system 800 to mediate data in a network 814 with an entity that is external to the processing system 800 through any communication protocol supported by the processing system 800 and the external entity. The network adapter 812 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

Remarks

The foregoing description of various embodiments has been provided for the purposes of illustration and description. It is not intended to be exhaustive or to limit the claimed subject matter to the precise forms disclosed.

Many modifications and variation will be apparent to those skilled in the art. Embodiments were chosen and described in order to best describe the principles of the technology and its practical applications, thereby enabling others skilled in the relevant art to understand the claimed subject matter, the various embodiments, and the various modifications that are suited to the uses contemplated.

The language used throughout the present disclosure has been principally selected for readability and instructional purposes. It is therefore intended that the scope of the present disclosure be limited not by this Detailed Description, but rather by any claims that issue on an application based herein. Accordingly, the description of various embodiments is intended to be illustrative, but not limiting, of the scope of the present disclosure, which is set forth in the following claims.

What is claimed is:

1. A system for optically tracking displacement of a moving object, the system comprising:
    a first structural unit that includes—
        (i) a first optical sensor configured to generate a first image of the moving object, and
        (ii) a first communication interface via which the first image is able to exit the first structural unit; and
    a second structural unit that includes—
        (i) a second optical sensor configured to generate a second image of the moving object,
        (ii) a second communication interface at which to receive the first image from the first structural unit, and
        (iii) a processor configured to produce an output that is representative of an indication of a direction or a magnitude of motion of the moving object by comparing the first and second images.

2. The system of claim 1, wherein the first communication interface is connected to the second communication interface via a wireless communication channel.

3. The system of claim 1, wherein the first communication interface is connected to the second communication interface via a wired communication channel.

4. The system of claim 1,
    wherein the first image is one of a first series of images generated by the first optical sensor of the moving object over a first interval of time, and
    wherein the first series of images are forwarded to the first communication interface, for transmission to the second communication interface, in near real time such that the first series of images are sequentially transmitted from the first structural unit to the second structural unit.

5. The system of claim 4,
    wherein the second image is one of a second series of images generate by the second optical sensor of the moving object over a second interval of time, and
    wherein at least a portion of the second interval of time overlaps the first interval of time.

6. The system of claim 5, wherein for each image in the first series of images, the processor examines the second series of images so as to identify a matching image.

7. A method for establishing displacement of a substrate moving in a printer, the method comprising:
    comparing, by a processor, a first image of the substrate that is generated by a first optical sensor at a first time to a second image of the substrate that is generated by a second optical sensor at a second time subsequent to the first time, so as to establish an amount of overlap between the first and second images; and
    determining, by the processor, displacement of the substrate from the first time to the second time based on (i) the amount of overlap and (ii) a distance between the first and second optical sensors.

8. The method of claim 7, wherein the processor is included in a structural unit that also includes the second optical sensor.

9. The method of claim 8, further comprising:
    receiving, by the processor, the first image from another structural unit that includes the first optical sensor; and
    storing, by the processor, the first image in a buffer until the second image is generated by the second optical sensor.

10. The method of claim 7, wherein said comparing comprises:
    applying an algorithm that compares the first image to the second image on a per-pixel basis and produces an output that is representative of the amount of overlap.

11. The method of claim 10, wherein the algorithm performs a strict comparison, fuzzy pixel comparison, histogram comparison, or correlation comparison of the first and second images.

12. The method of claim 10, wherein the algorithm defines and then employs a mask to verify a degree to which the second image matches the first image.

13. The method of claim 7, wherein said comparing comprises:
    generating a two-dimensional (2D) array by comparing intensity values of the first image to intensity values of the second image, such that the 2D array represents the amount of overlap between the first and second images with different relative offsets.

14. The method of claim 7, further comprising:
    in response to a determination that the displacement exceeds a threshold,
        establishing, by the processor, that the second image does not match the first image.

15. The method of claim 7, further comprising:
    in response to a determination that the displacement does not exceed a threshold, establishing, by the processor, that the second image does match the first image.

16. An apparatus for establishing displacement of media being conveyed through a printer in a given direction, the apparatus comprising:
    an optical sensor that is configured to generate a series of images of the media;
    a transceiver at which to receive an image of the media that is generated by another optical sensor located upstream the apparatus in the given direction; and
    a processor that is configured to:
        compare the image against each image in the series of images until a matching image is found, and
        establish displacement of the media based on the matching image.

17. The apparatus of claim 16, further comprising:
a buffer into which the image is loaded by the processor for storage.

18. The apparatus of claim 17, wherein the buffer is one of multiple buffers into which the processor loads images received at the transceiver for storage, such that no more than one of the images is stored in each of the multiple buffers at any given point in time.

19. The apparatus of claim 16, wherein the processor is further configured to:
communicate the displacement to the printer, such that the printer is able to alter an operation to address movement of the media.

20. The apparatus of claim 19, wherein said comparing, said establishing, and said communicating are performed in response to the image being received at the transceiver, such that movement of the media is monitored and, if necessary, addressed in near real time.

* * * * *